United States Patent
Yoshimura et al.

(10) Patent No.: US 12,503,570 B2
(45) Date of Patent: Dec. 23, 2025

(54) INORGANIC FILLER FLUIDITY MODIFIER, INORGANIC FILLER-CONTAINING RESIN COMPOSITION AND MOLDED ARTICLE OF RESIN COMPOSITION

(71) Applicant: DIC Corporation, Tokyo (JP)

(72) Inventors: Hiroshi Yoshimura, Chihara (JP); Junko Yamamoto, Ichihara (JP); Yusuke Tajiri, Ichihara (JP)

(73) Assignee: DIC Corporation, Tokyo (JP)

( * ) Notice: Subject to any disclaimer, the term of this patent is extended or adjusted under 35 U.S.C. 154(b) by 222 days.

(21) Appl. No.: 18/275,620

(22) PCT Filed: Feb. 17, 2022

(86) PCT No.: PCT/JP2022/006293
§ 371 (c)(1),
(2) Date: Aug. 3, 2023

(87) PCT Pub. No.: WO2022/185930
PCT Pub. Date: Sep. 9, 2022

(65) Prior Publication Data
US 2024/0101786 A1    Mar. 28, 2024

(30) Foreign Application Priority Data
Mar. 4, 2021 (JP) ................. 2021-034273

(51) Int. Cl.
*C08K 5/092* (2006.01)
*C08K 3/013* (2018.01)
(52) U.S. Cl.
CPC .............. *C08K 5/092* (2013.01); *C08K 3/013* (2018.01)

(58) Field of Classification Search
CPC .......... C08L 67/00–67/08; C08L 63/00–63/10; C08K 5/092
See application file for complete search history.

(56) References Cited

U.S. PATENT DOCUMENTS

| | | | |
|---|---|---|---|
| 2008/0319123 | A1 | 12/2008 | Haubennestel et al. |
| 2018/0294201 | A1 | 10/2018 | Kondo et al. |

FOREIGN PATENT DOCUMENTS

| | | |
|---|---|---|
| CN | 102634000 A | 8/2012 |
| JP | 2007-530269 A | 11/2007 |
| JP | 2011-79935 A | 4/2011 |
| JP | 2018-181959 A | 11/2018 |

*Primary Examiner* — Prashant J Khatri
(74) *Attorney, Agent, or Firm* — Troutman Pepper Locke LLP; James E. Armstrong, IV; Nicholas J. DiCeglie, Jr.

(57) ABSTRACT

To provide an inorganic filler fluidity modifier for improving the fluidity of an inorganic filler. Specifically, the inorganic filler fluidity modifier is an ester resin represented by the following general formula (1) (M is an aliphatic monoalcohol residue having 3 to 18 carbon atoms, L is an aliphatic hydroxycarboxylic acid residue having 2 to 23 carbon atoms, and A is an aliphatic dicarboxylic acid residue having 1 to 8 carbon atoms or an aromatic dicarboxylic acid residue having 6 to 18 carbon atoms)

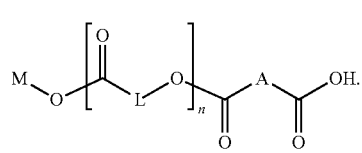

(1)

20 Claims, No Drawings

INORGANIC FILLER FLUIDITY MODIFIER, INORGANIC FILLER-CONTAINING RESIN COMPOSITION AND MOLDED ARTICLE OF RESIN COMPOSITION

TECHNICAL FIELD

The present invention relates to an inorganic filler fluidity modifier, an inorganic filler-containing resin composition, and a molded article of the resin composition.

BACKGROUND ART

Building materials, automobile members, sanitary absorbent articles, stone paper, heat dissipation materials, and the like are molded from a resin composition containing an inorganic filler, and various functions such as impact resistance, bending resistance, dimensional stability, moisture permeability, and heat dissipation properties are imparted by the inorganic filler.

In order to improve the functionality of the molded article and/or to reduce the cost by increasing the amount, it is required to further increase the filling amount of the inorganic filler. However, when the filling amount of the inorganic filler in the resin composition is increased, there is a problem in that the fluidity of the inorganic filler is reduced, the fluidity of the resin composition is also reduced, and the moldability of the resin composition is significantly impaired.

For example, in urethane waterproof flooring applications, calcium carbonate is generally used as an inorganic filler. However, when the filling amount of calcium carbonate is increased, there is a problem in that the viscosity is increased and the moldability and handleability are deteriorated.

As a means for solving the problem that the moldability of a composition is impaired by blending a filler, a method of further adding a viscosity reducing agent has been proposed (for example, PTL 1). In addition, a method of improving the fluidity of a composition by further adding a fluidity modifier that improves the fluidity of a filler has been proposed (for example, PTL 2). However, even the viscosity reducing agent and the fluidity modifier do not have a sufficient effect of improving the fluidity of a resin composition.

CITATION LIST

Patent Literature

PTL 1: JP2011-79935A
PTL 2: JP2018-181959A

SUMMARY OF INVENTION

Technical Problem

The problem to be solved by the present invention is to provide an inorganic filler fluidity modifier that improves the fluidity of an inorganic filler.

Solution to Problem

As a result of intensive studies to solve the above problems, the present inventors have found that an ester resin having a specific structure exhibits an excellent fluidity-modifying effect on an inorganic filler, and have completed the present invention.

That is, the present invention relates to an inorganic filler fluidity modifier which is an ester resin represented by the following general formula (1):

[Chem. 1]

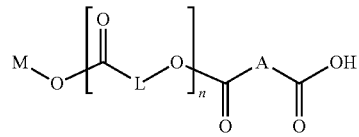

(1)

(In the general formula (1), M represents an aliphatic monoalcohol residue having 3 to 18 carbon atoms; L represents an aliphatic hydroxycarboxylic acid residue having 2 to 23 carbon atoms; A represents an aliphatic dicarboxylic acid residue having 1 to 8 carbon atoms or an aromatic dicarboxylic acid residue having 6 to 18 carbon atoms; and n represents the number of repetitions.)

Advantageous Effects of Invention

According to the present invention, an inorganic filler fluidity modifier that improves the fluidity of an inorganic filler can be provided.

DESCRIPTION OF EMBODIMENTS

Hereinafter, an embodiment of the present invention will be described. The present invention is not limited to the following embodiment, and can be implemented with appropriate modifications within a range that does not impair the effects of the present invention.

[Inorganic Filler Fluidity Modifier]

The inorganic filler fluidity modifier of the present invention is an ester resin represented by the following general formula (1).

Hereinafter, the ester resin which is the inorganic filler fluidity modifier of the present invention may be referred to as the "ester resin of the present invention".

[Chem. 2]

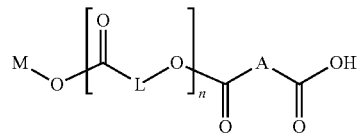

(1)

(In the formula (1), M represents an aliphatic monoalcohol residue having 3 to 18 carbon atoms; L represents an aliphatic hydroxycarboxylic acid residue having 2 to 23 carbon atoms; A represents an aliphatic dicarboxylic acid residue having 1 to 8 carbon atoms or an aromatic dicarboxylic acid residue having 6 to 18 carbon atoms; and n represents the number of repetitions.)

It is considered that in the ester resin of the present invention, the carboxy group at one end is adsorbed to the inorganic filler, and the polyhydroxycarboxylic acid chain containing an aliphatic monoalcohol residue at the other end ensures compatibility with the base resin in the resin composition, thereby modifying the fluidity of the inorganic filler.

In the present invention, the term "alcohol residue" refers to the remaining organic group excluding a hydroxy group from an alcohol.

In the present invention, the term "hydroxycarboxylic acid residue" refers to the remaining organic group excluding a hydroxy group and a carboxy group from a hydroxycarboxylic acid. The number of carbon atoms in the hydroxycarboxylic acid residue does not include the carbon atoms in the carboxy group.

In the present invention, the dicarboxylic acid residue refers to the remaining organic group excluding two carboxy groups from a dicarboxylic acid. The number of carbon atoms in the dicarboxylic acid residue does not include the carbon atoms in the carboxy group.

The aliphatic chain of the aliphatic monoalcohol residue of M may be linear or branched, and may contain an alicyclic structure and/or an ether bond. In addition, the aliphatic chain of the aliphatic monoalcohol residue of M may be an unsaturated aliphatic chain having a carbon-carbon unsaturated bond.

Examples of the aliphatic monoalcohol residue having 3 to 18 carbon atoms of M include a propanol residue, a butanol residue, a pentanol residue, a hexanol residue, a cyclohexanol residue, a heptanol residue, an octanol residue, a nonanol residue, a decanol residue, an undecanol residue, a cetanol residue, and a stearyl alcohol residue.

The aliphatic monoalcohol residue having 3 to 18 carbon atoms of M is preferably an aliphatic monoalcohol residue having 5 to 18 carbon atoms, more preferably an aliphatic monoalcohol residue having a branched structure having 5 to 18 carbon atoms, and still more preferably an aliphatic monoalcohol residue having a branched structure having 7 to 18 carbon atoms.

For example, when M is an aliphatic monoalcohol residue which is a branched alkyl group having 5 to 18 carbon atoms, the compatibility with the base resin in the resin composition can be further enhanced.

The aliphatic chain of the aliphatic hydroxycarboxylic acid residue of L may be linear or branched, and may contain an alicyclic structure and/or an ether bond. In addition, the aliphatic chain of the aliphatic hydroxycarboxylic acid residue of L may be an unsaturated aliphatic chain having a carbon-carbon unsaturated bond.

Examples of the aliphatic hydroxycarboxylic acid residue having 2 to 23 carbon atoms of L include hydroxycarboxylic acid residues in which one hydroxy group is substituted on an aliphatic chain of an aliphatic carboxylic acid having 2 to 23 carbon atoms, such as propionic acid, butyric acid, valeric acid, caproic acid, enanthic acid, capric acid, undecylic acid, lauric acid, tridecylic acid, myristic acid, pentadecylic acid, palmitic acid, margaric acid, and stearic acid. Specific examples thereof include a lactic acid residue, a 9-hydroxystearic acid residue, a 12-hydroxystearic acid residue, a 6-hydroxycaproic acid residue, and a ricinoleic acid residue.

The aliphatic hydroxycarboxylic acid residue having 2 to 23 carbon atoms of L is preferably an aliphatic hydroxycarboxylic acid residue having a branched structure having 2 to 23 carbon atoms, and more preferably an aliphatic hydroxycarboxylic acid residue having a branched structure having 12 to 23 carbon atoms.

For example, when L is a hydroxycarboxylic acid residue which is a branched alkylene group having 2 to 23 carbon atoms, the compatibility with the base resin in the resin composition can be further enhanced.

The n L's may be used singly or in combination of two or more kinds thereof.

L may be, for example, the coexistence of both an aliphatic hydroxycarboxylic acid residue having a branched structure having 12 to 23 carbon atoms and an aliphatic hydroxycarboxylic acid residue having 2 to 6 carbon atoms.

When L is the coexistence of L1, which is an aliphatic hydroxycarboxylic acid residue having a branched structure having 12 to 23 carbon atoms, and L2, which is an aliphatic hydroxycarboxylic acid residue having 2 to 6 carbon atoms, the abundance ratio (molar ratio) of L1 and L2 is, for example, L1:L2=(60 to 95):(40 to 5).

The aliphatic chain of the aliphatic dicarboxylic acid residue of A may be linear or branched, and may contain an alicyclic structure and/or an ether bond. In addition, the aliphatic chain of the aliphatic dicarboxylic acid residue of A may be a saturated aliphatic chain or an unsaturated aliphatic chain having a carbon-carbon unsaturated bond.

Examples of the aliphatic dicarboxylic acid residue having 1 to 8 carbon atoms of A include a malonic acid residue, a succinic acid residue, a glutaric acid residue, an adipic acid residue, a pimelic acid residue, a suberic acid residue, an azelaic acid residue, a sebacic acid residue, a maleic acid residue, a fumaric acid residue, a 1,2-dicarboxycyclohexane residue, and a 1,2-dicarboxycyclohexene residue.

Examples of the aromatic dicarboxylic acid residue having 6 to 18 carbon atoms of A include a phthalic acid residue, an isophthalic acid residue, and a terephthalic acid residue.

A is preferably an aliphatic dicarboxylic acid residue having 1 to 8 carbon atoms, and more preferably an aliphatic dicarboxylic acid residue having 2 to 4 carbon atoms.

n represents the number of repetitions, and the average value of the number of repetitions is preferably in the range of 2 to 20.

The average value of n can be determined from the number average molecular weight of the polyester.

The number average molecular weight (Mn) of the polyester of the present invention is, for example, in the range of 500 to 5,000, preferably in the range of 500 to 4,000, more preferably in the range of 500 to 3,000, and still more preferably in the range of 700 to 3,000.

The number average molecular weight (Mn) is a value in terms of polystyrene based on gel permeation chromatography (GPC) measurement, and is measured by the method described in Examples.

The acid value of the polyester of the present invention is preferably in the range of to 120, more preferably in the range of 7 to 80, and still more preferably in the range of 7 to 50.

The acid value of the polyester is determined by the method described in Examples.

The properties of the polyester of the present invention vary depending on the number average molecular weight, composition and the like, but the polyester is preferably a liquid at room temperature.

Here, "liquid at room temperature" means that the polyester of the present invention has a property of exhibiting fluidity at room temperature of 25° C.

The polyester of the present invention is obtained by using a reaction raw material containing an aliphatic monoalcohol, an aliphatic hydroxycarboxylic acid, an aliphatic dicarboxylic acid, or an aromatic dicarboxylic acid. Here, the reaction raw material means a raw material constituting the polyester of the present invention and does not include a solvent or a catalyst which does not constitute the polyester.

The method for producing the polyester of the present invention is not particularly limited, and the polyester can be produced by a known method, and can be produced by a production method described below.

The reaction raw material of the polyester of the present invention may contain other raw materials as long as it contains an aliphatic monoalcohol, a hydroxycarboxylic acid, an aliphatic dicarboxylic acid, or an aromatic dicarboxylic acid.

The reaction raw material of the polyester of the present invention contains preferably 90% by mass or more of an aliphatic monoalcohol, an aliphatic hydroxycarboxylic acid, an aliphatic dicarboxylic acid, or an aromatic dicarboxylic acid with respect to the total amount of the reaction raw materials, and more preferably consists of only an aliphatic monoalcohol, an aliphatic hydroxycarboxylic acid, an aliphatic dicarboxylic acid, or an aromatic dicarboxylic acid.

The aliphatic monoalcohol used in the production of the polyester of the present invention is an aliphatic monoalcohol corresponding to the aliphatic monoalcohol residue having 3 to 18 carbon atoms of M, and the aliphatic monoalcohol to be used may be used alone or in combination of two or more kinds thereof.

The aliphatic hydroxycarboxylic acid used in the production of the polyester of the present invention is an aliphatic hydroxycarboxylic acid corresponding to the aliphatic hydroxycarboxylic acid residue having 2 to 23 carbon atoms of L, and the aliphatic hydroxycarboxylic acid to be used may be used alone or in combination of two or more kinds thereof.

The aliphatic dicarboxylic acid used in the production of the polyester of the present invention is an aliphatic dicarboxylic acid corresponding to the aliphatic dicarboxylic acid residue having 1 to 8 carbon atoms of A, and the aliphatic dicarboxylic acid to be used may be used alone or in combination of two or more kinds thereof.

The aromatic dicarboxylic acid used in the production of the polyester of the present invention is an aromatic dicarboxylic acid corresponding to the aromatic dicarboxylic acid residue having 6 to 18 carbon atoms of A, and the aromatic dicarboxylic acid to be used may be used alone or in combination of two or more kinds thereof.

The reaction raw materials to be used also include derivatives such as esters, acid chlorides, and acid anhydrides of the above-mentioned compounds. For example, in the case of a hydroxycarboxylic acid, a compound having a lactone structure such as ε-caprolactone is also included.

As the aliphatic monoalcohol, the aliphatic hydroxycarboxylic acid, the aliphatic dicarboxylic acid and the aromatic dicarboxylic acid used in the production of the polyester of the present invention, derivatives thereof can be used.

Examples of the derivatives include esters, acid chlorides, and cyclic esters.

When two kinds of aliphatic hydroxycarboxylic acids are used in combination, for example, an aliphatic hydroxycarboxylic acid having a branched structure having 13 to 24 carbon atoms and an aliphatic hydroxycarboxylic acid having 3 to 7 carbon atoms are preferably used in combination.

At this time, the molar ratio between the aliphatic hydroxycarboxylic acid having a branched structure having 13 to 24 carbon atoms and the aliphatic hydroxycarboxylic acid having 3 to 7 carbon atoms can be, for example, (aliphatic hydroxycarboxylic acid having a branched structure having 13 to 24 carbon atoms):(aliphatic hydroxycarboxylic acid having 3 to 7 carbon atoms)=(60 to 95):(40 to 5).

The polyester represented by the general formula (1) can be produced, for example, by reacting an aliphatic hydroxycarboxylic acid with an aliphatic monoalcohol under the condition that the equivalent of the hydroxy group is larger than the equivalent of the carboxy group to obtain a polyester having a hydroxy group only at one end of the main chain, and then further reacting the obtained polyester with an aliphatic dicarboxylic acid or an aromatic dicarboxylic acid.

In the production of the polyester of the present invention, the raw materials may be esterified in a temperature range of, for example, 170 to 250° C. for 10 to 25 hours, optionally in the presence of an esterification catalyst.

The conditions such as the temperature and time of the esterifying reaction are not particularly limited and may be appropriately set.

Examples of the esterification catalyst include titanium-based catalysts such as tetraisopropyl titanate and tetrabutyl titanate; zinc-based catalysts such as zinc acetate; tin-based catalysts such as tin octoate and dibutyltin oxide; and organic sulfonic acid-based catalysts such as p-toluenesulfonic acid.

The amount of the esterification catalyst to be used may be appropriately set, but is usually in the range of 0.001 to 0.1 parts by mass with respect to 100 parts by mass of the total amount of the reaction raw materials.

[Inorganic Filler-Containing Resin Composition]

The inorganic filler fluidity modifier of the present invention can function as a fluidity modifier for an inorganic filler in a resin composition containing an inorganic filler and a resin (inorganic filler-containing resin composition). By containing the inorganic filler fluidity modifier of the present invention, the filling amount of the inorganic filler in the resin composition can be increased, and handleability, moldability, and the like can also be improved.

Hereinafter, each component contained in the inorganic filler-containing resin composition of the present invention will be described.

(Inorganic Filler)

The inorganic filler contained in the inorganic filler-containing resin composition of the present invention is not particularly limited, and examples thereof include calcium carbonate, talc, silica, clay, antimony oxide, alumina, aluminum hydroxide, magnesium hydroxide, hydrotalcite, calcium silicate, magnesium oxide, potassium titanate, barium titanate, titanium oxide, calcium oxide, manganese dioxide, boron nitride, and aluminum nitride.

The inorganic filler may be used alone or in combination of two or more kinds thereof.

The inorganic filler is preferably one or more selected from the group consisting of calcium carbonate, silica, alumina, aluminum hydroxide, barium titanate, talc, boron nitride, and aluminum nitride, and more preferably one or more selected from the group consisting of calcium carbonate, alumina, aluminum hydroxide, and talc.

The shape of the inorganic filler, such as the particle diameter, the fiber length, and the fiber diameter, is not particularly limited, and may be appropriately adjusted depending on the intended use. The surface treatment state of the inorganic filler is also not particularly limited, and the surface may be modified with, for example, a saturated fatty acid or the like depending on the intended use.

The content of the inorganic filler fluidity modifier of the present invention is not particularly limited, and is, for example, in the range of 0.01 to 30 parts by mass of the inorganic filler fluidity modifier of the present invention with respect to 100 parts by mass of the inorganic filler, preferably in the range of 0.05 to 10 parts by mass of the inorganic filler fluidity modifier of the present invention with respect to 100 parts by mass of the inorganic filler, and more preferably in the range of 0.1 to 5.0 parts by mass of the inorganic filler fluidity modifier of the present invention with respect to 100 parts by mass of the inorganic filler.

(Plasticizer)

The inorganic filler-containing resin composition of the present invention preferably contains a plasticizer.

Examples of the plasticizer include benzoic acid esters such as diethylene glycol dibenzoate; phthalic acid esters such as dibutyl phthalate (DBP), di-2-ethylhexyl phthalate (DOP), diisononyl phthalate (DINP), diisodecyl phthalate (DIDP), diundecyl phthalate (DUP), and ditridecyl phthalate (DTDP); terephthalic acid esters such as bis(2-ethylhexyl) terephthalate (DOTP); isophthalic acid esters such as bis(2-ethylhexyl) isophthalate (DOIP); pyromellitic acid esters such as tetra-2-ethylhexyl pyromellitate (TOPM); aliphatic dibasic acid esters such as di-2-ethylhexyl adipate (DOA), diisononyl adipate (DINA), diisodecyl adipate (DIDA), di-2-ethylhexyl sebacate (DOS), and diisononyl sebacate (DINS); phosphate esters such as tri-2-ethylhexyl phosphate (TOP) and tricresyl phosphate (TCP); alkyl esters of polyhydric alcohols such as pentaerythritol; polyesters having a molecular weight of 800 to 4,000 synthesized by polyesterification of dibasic acids such as adipic acid and glycols; epoxidized esters such as epoxidized soybean oil and epoxidized linseed oil; alicyclic dibasic acids such as diisononyl hexahydrophthalate; fatty acid glycol esters such as 1.4-butanediol dicaprate; acetyl tributyl citrate (ATBC); chlorinated paraffins obtained by chlorinating paraffin wax or n-paraffin; chlorinated fatty acid esters such as chlorinated stearate; and higher fatty acid esters such as butyl oleate.

The plasticizer to be used may be determined depending on the intended use, and the plasticizer may be used alone or in combination of two or more kinds thereof.

The content of the plasticizer is not particularly limited, and is, for example, in the range of 5 to 300 parts by mass of the plasticizer with respect to 100 parts by mass of the inorganic filler, and preferably in the range of 10 to 200 parts by mass of the plasticizer with respect to 100 parts by mass of the inorganic filler.

The additives contained in the inorganic filler-containing resin composition of the present invention are not limited to the inorganic filler fluidity modifier of the present invention and the plasticizer, and other additives may be contained.

Examples of the other additives include a viscosity reducing agent, a flame retardant, a stabilizer, a stabilization aid, a colorant, a processing aid, a filler, an antioxidant (aging inhibitor), an ultraviolet absorber, a light stabilizer, a lubricant, an antistatic agent, and a crosslinking aid.

(Resin)

The resin contained in the inorganic filler-containing resin composition of the present invention is not particularly limited, and examples thereof include polyolefins, polyesters, polysulfides, polyvinyl chlorides, modified polysulfides, silicone resins, modified silicone resins, acrylic urethane resins, epoxy resins, polyurethanes, acrylic resins, polyesters, and unsaturated polyesters.

The resin to be used may be determined depending on the intended use, and the resin may be used alone or in combination of two or more kinds thereof.

The inorganic filler-containing resin composition of the present invention contains a resin, but the inorganic filler fluidity modifier of the present invention can also be suitably used in a composition containing a viscous compound such as asphalt instead of a resin.

The inorganic filler-containing resin composition of the present invention can be suitably used as a paste-like resin composition which requires fluidity when used.

Since the inorganic filler fluidity modifier of the present invention can reduce the viscosity of the composition and increase the filling amount of the inorganic filler, it can be applied to paints, adhesives, structural materials and the like, and is suitable for structural materials (building materials) for which an increase in the filler content is desired, and polysulfide-based sealing materials having a particularly high filler content.

Hereinafter, composition examples according to applications in the case of using the inorganic filler-containing resin composition of the present invention as a paste-like resin composition will be described.

(Structural Material)

Examples of the resin contained in the inorganic filler-containing resin composition used for the structural material include polyolefin, polyurethane, and unsaturated polyester.

The resin used for the structural material (building material) varies depending on the application, and for example, polyurethane is mainly used as the resin component in the case of a waterproof material, and unsaturated polyester is mainly used in the case of artificial marble.

When the structural material is a waterproof material, the inorganic filler-containing resin composition used for the waterproof material (hereinafter sometimes simply referred to as "resin composition for a waterproof material") is preferably, for example, a polyurethane composition containing a main agent component containing an isocyanate group-containing compound and a curing agent component containing one or more selected from the group consisting of an aromatic polyamine, a polyol, water, and moisture.

The isocyanate group-containing compound contained in the main agent component is preferably an isocyanate group-terminated polyurethane prepolymer obtained by reacting a polyisocyanate having a diphenylmethane diisocyanate structure with a polyol.

Examples of the polyisocyanate include 4,4'-diphenylmethane diisocyanate, 2,4'-diphenylmethane diisocyanate, and 2,2'-diphenylmethane diisocyanate. Among them, an isocyanate mixture of 4,4'-diphenylmethane diisocyanate and 2,4'-diphenylmethane diisocyanate and/or 2,2'-diphenylmethane diisocyanate is preferred.

As the polyol, polyoxypropylene polyol is preferred, and polyoxypropylene diol alone or a mixture of polyoxypropylene diol and polyoxypropylene triol is more preferred.

The ratio between the polyisocyanate and the polyol in the isocyanate group-terminated urethane prepolymer is preferably in the range of 1.8 to 2.5 in terms of the molar ratio (NCO/OH) between the isocyanate group and the hydroxy group. The isocyanate group content (NCO group content) in the isocyanate group-terminated urethane prepolymer is preferably in the range of 2 to 5% by mass.

Examples of the aromatic polyamine contained in the curing agent component include 4,4'-methylenebis(2-chloroaniline), dimethylthiotoluenediamine, and diethyltoluenediamine. Among these, 4,4'-methylenebis(2-chloroaniline) is known as "MOCA" and is widely used.

The polyol contained in the curing agent component is preferably a polyether polyol, and particularly preferably a polyoxypropylene polyol. The number of functional groups of the polyol is preferably in the range of 2 to 4, and more preferably in the range of 2 to 3.

When the polyurethane is of a two-pack curing type, the mixing ratio between the main agent and the curing agent is such that the molar ratio (NCO/(NH$_2$+OH)) between the isocyanate group contained in the main agent and the active hydrogen-containing group contained in the curing agent is, for example, in the range of 1.0 to 2.0, preferably in the range of 1.0 to 1.8, and more preferably in the range of 1.0 to 1.3.

The curing agent component preferably contains an inorganic filler, and examples of the inorganic filler include calcium carbonate, talc, clay, silica, and carbon.

The content of the inorganic filler in the polyurethane composition is, for example, in the range of 10 to 60 parts by mass, and preferably in the range of 20 to 50 parts by mass, with respect to 100 parts by mass of the resin component. When the content of the inorganic filler is in the above range, the balance between the curability of the composition and the capability of the waterproof material to be obtained can be improved.

In the case of a two-pack curing type polyurethane, the viscosities of both the main agent and the curing agent are usually high (main agent: for example, in the range of 7 to 10 Pas, curing agent: for example, in the range of 10 to 30 Pas), and the viscosity further increases in winter when the ambient temperature decreases. Therefore, the inorganic filler fluidity modifier of the present invention that can improve the dispersibility of the inorganic filler and improve the content is useful.

The inorganic filler fluidity modifier of the present invention may be contained in the resin composition for a waterproof material. For example, in the case of the two-pack curing type polyurethane, the inorganic filler fluidity modifier of the present invention may be contained in at least one of the main agent component and the curing agent component.

In order to accelerate the urethanization reaction, the curing agent component may contain a known curing catalyst. Examples of the curing catalyst include organic acid lead, organic acid tin, and a tertiary amine compound.

The curing agent component may contain, in addition to the inorganic filler and the curing catalyst, pigments such as the viscosity reducing agent, the plasticizer, chromium oxide, titanium oxide, and phthalocyanine; stabilizers such as an antioxidant, an ultraviolet absorber, and a dehydrating agent; and the like.

Examples of the waterproof material obtained by molding the composition for a waterproof material include a rooftop waterproof material.

The rooftop waterproof material is obtained, for example, by applying a composition in which a main agent component and a curing agent component are mixed to a desired place to form a coating film, and reacting and curing the coating film.

(Sealing Material)

The polysulfide-based resin used in the polysulfide-based sealing material is not particularly limited as long as it is a resin having a sulfide bond in a molecule, and examples thereof include those in which a hydrocarbon group such as an alkyl group is bonded to a sulfide bond. The polysulfide resin may have, for example, an ether bond, an ester bond, an amide bond, or an imide group in the skeleton.

When the polysulfide-based resin has an ether bond in the skeleton, the polysulfide-based resin is a polysulfide polyether resin. The polysulfide resin may have a functional group such as a thiol group, a hydroxy group, or an amino group at one terminal or both terminals.

Examples of the polysulfide-based resin include those containing a structural unit represented by —(C$_2$H$_4$OCH$_2$OC$_2$H$_4$—Sx)- (x is an integer of 1 to 5) in the main chain and having a thiol group represented by —C$_2$H$_4$OCH$_2$OC$_2$H$_4$—SH at the terminal.

The polysulfide-based resins preferably have fluidity at room temperature, in particular at 25° C. The number average molecular weight (Mn) of the polysulfide resins is usually 100 to 200,000, and preferably 400 to 50,000 or less.

Further, as the polysulfide-based resin, a polysulfide polyether resin is also exemplified. Specific examples of the polysulfide polyether resin include thiol group-containing polysulfide polyether resins, for example, those containing a polyether moiety represented by (1) "—(R$^1$O)$_n$" (R$^1$ represents an alkylene group having 2 to 4 carbon atoms, and n represents an integer of 6 to 200) and a structural unit represented by (2) "—C$_2$H$_4$OCH$_2$OC$_2$H$_4$—Sx-" and (3) "—CH$_2$CH(OH)CH$_2$—Sx-" (x is an integer of 1 to 5) in the main chain, and having a thiol group represented by (4) "—C$_2$H$_4$OCH$_2$OC$_2$H$_4$—SH" or "—CH$_2$CH(OH)CH$_2$—SH" at the terminal.

The number average molecular weight of the polysulfide polyether resins is usually 600 to 200,000, and preferably 800 to 50,000.

The production method of the polysulfide-based resin is not limited, and resins produced by various known methods can be used. A commercially available product can also be used as the polysulfide-based resin. Examples of commercially available polysulfide resins include "Thiokol LP-23 and LP-32" (manufactured by Toray Fine Chemicals Co., Ltd.) and "THIOPLAST polymer" (manufactured by AKZO NOBEL). The polysulfide-based resin may be used alone or in combination of two or more kinds thereof.

In the polysulfide-based sealing material containing the inorganic filler fluidity modifier of the present invention, other various additives and the like can be used in combination. Examples of the additive include the viscosity reducing agent, the plasticizer, an adhesion promoter, a pigment, a dye, an aging inhibitor, an antioxidant, an antistatic agent, a flame retardant, a tackifying resin, a stabilizer, and a dispersant.

As the adhesion promoter, for example, a silane coupling agent such as aminosilane is suitably used because it has an excellent effect of improving the adhesiveness to a glass surface and is a general-purpose compound.

Examples of the aminosilane include 3-aminopropyltrimethoxysilane, 3-aminopropyltriethoxysilane, 3-aminopropylmethyldimethoxysilane, 3-aminopropylethyldiethoxysilane, bistrimethoxysilylpropylamine, bistriethoxysilylpropylamine, bismethoxydimethoxysilylpropylamine, bisethoxydiethoxysilylpropylamine, N-2-(aminoethyl)-3-aminopropyltrimethoxysilane, N-2-(aminoethyl)-3-aminopropylmethyldimethoxysilane, N-2-(aminoethyl)-3-aminopropyltriethoxysilane, and N-2-(aminoethyl)-3-aminopropylethyldiethoxysilane.

Examples of the pigment include organic pigments such as an azo pigment and a copper phthalocyanine pigment.

Examples of the dye include a black dye, a yellow dye, a red dye, a blue dye, and a brown dye.

Examples of the aging inhibitor include hindered phenol-based compounds and hindered amine-based compounds.

Examples of the antioxidant include butylhydroxytoluene (BHT) and butylhydroxyanisole (BHA).

Examples of the antistatic agent include quaternary ammonium salts; and hydrophilic compounds such as polyglycols and ethylene oxide derivatives.

Examples of the flame retardant include chloroalkyl phosphate, dimethyl methylphosphonate, a bromine-phosphorus compound, ammonium polyphosphate, neopentyl bromide-polyether, and brominated polyether.

Examples of the tackifying resin include a terpene resin, a phenol resin, a terpene-phenol resin, a rosin resin, a xylene resin, an epoxy resin, alkyl titanates, and organic polyisocyanates.

Examples of the stabilizer include a fatty acid silyl ester and a fatty acid amide trimethylsilyl compound.

The dispersant refers to a substance for dispersing a solid in a liquid in the form of fine particles, and examples thereof include sodium hexametaphosphate, sodium condensed naphthalenesulfonate, and surfactants.

The polysulfide-based sealing material is usually mixed with a curing agent immediately before use. As the curing agent, for example, curing agents generally used for a polysulfide resin-based sealing material, such as a metal oxide, a metal peroxide, an organic or inorganic oxidizing agent, an epoxy compound, and an isocyanate compound, can be used. Among them, metallic peroxides such as lead dioxide and manganese dioxide are preferable, and manganese dioxide is more preferable. The fluidity modifier of the present invention is preferably used by mixing it into the curing agent.

When manganese dioxide is used as the curing agent, the amount of manganese dioxide used is preferably in the range of 2.5 to 25 parts by mass, and more preferably in the range of 3 to 20 parts by mass, with respect to 100 parts by mass of the polysulfide resin used as the main component, because sufficient curing is achieved and a cured product having appropriate elasticity can be obtained.

The curing agent may contain other fillers, a plasticizer, a curing accelerator, and a silane coupling agent.

In the case of being used as a sealing material, the curing condition is usually 20 to 25° C. after the main agent and the curing agent are mixed. The curing time is usually in the range of 24 to 168 hours.

The inorganic filler-containing resin composition of the present invention is not limited to the above-mentioned paste-like resin composition, and can also be suitably used as a resin composition for molding such as injection molding and extrusion molding.

The resin composition for molding has various properties, such as being liquid at a stage before molding (normal temperature) or being made liquid by heating during molding, but the inorganic filler fluidity modifier of the present invention can improve the fluidity of the inorganic filler, so that an excessive increase in viscosity due to the inclusion of the inorganic filler can be suppressed, and melt kneading can be performed smoothly.

Since the inorganic filler fluidity modifier of the present invention can increase the amount of the inorganic filler to be added, the inorganic filler fluidity modifier can be suitably used for a resin composition for molding, such as an automobile member, a sanitary absorbent article, a building material, stone paper, or a heat dissipation member, in which it is desired to improve physical properties by increasing the amount of the inorganic filler to be added.

Hereinafter, composition examples according to applications in the case of using the inorganic filler-containing resin composition of the present invention as a resin composition for molding will be described.

(Automobile Member)

The resin component contained in the resin composition for molding used for an automobile member (hereinafter, sometimes simply referred to as "resin composition for an automobile member") is, for example, a thermoplastic resin, and among the thermoplastic resins, a polypropylene resin having characteristics such as excellent moldability, high mechanical strength, and economic efficiency is preferable.

The polypropylene is not particularly limited, but polypropylene resins having MFR (230° C., 2.16 kg) of 60 to 120 g/10 minutes are preferable.

The resin composition for an automobile member may further include an olefin-based thermoplastic elastomer as a resin component. The olefin-based thermoplastic elastomer is not particularly limited, but preferably includes an ethylene-α-olefin copolymer.

Examples of the inorganic filler contained in the resin composition for an automobile member include talc, calcium carbonate, whiskers (examples of the material of the whiskers include graphite, potassium titanate, alumina, silicon carbide, silicon nitride, mullite, magnesia, magnesium borate, aluminum borate, magnesium sulfate, zinc oxide, and titanium boride), carbon nanofibers, carbon nanotubes, kaolin clay, and mica.

The resin composition for an automobile member may contain various additives other than the inorganic filler fluidity modifier of the present invention and the inorganic filler, and examples of the additives include the viscosity reducing agent, the plasticizer, an antioxidant, an ultraviolet absorber, a light stabilizer, a flame retardant, and a colorant.

The composition ratio of the resin component, the inorganic filler, the inorganic filler fluidity modifier, and the like contained in the resin composition for an automobile member is not particularly limited, but the composition is preferably adjusted so as to satisfy one or more of the following physical properties.

The MFR (230° C., 2.16 kg, JIS K 7210-1) of the resin composition for an automobile member is preferably 20 g/10 minutes or more, and more preferably in the range of 20 to 30 g/10 minutes.

The linear expansion coefficient (JIS K 7197) of the resin composition for an automobile member is preferably $5.0 \times 10^{-5}$/K or less, and more preferably 4.0 to $5.0 \times 10^{-5}$/K.

The tensile elastic modulus (JIS K 7161) of the resin composition for an automobile member is preferably 2.5 GPa or more, and more preferably in the range of 2.5 to 3.0 GPa.

The Charpy impact value (JIS K 7111) of the resin composition for an automobile member is preferably 30 $kJ/m^2$ or more, and more preferably in the range of 30 to 40 $kJ/m^2$.

Examples of the automobile member obtained by molding the resin composition for an automobile member include a bonnet hood, a fender, a bumper, a door, a trunk lid, a roof, a radiator grille, a wheel cap, an instrument panel, and a pillar garnish.

These automobile members can be produced by injection molding the resin composition for an automobile member.

(Sanitary Absorbent Article)

The resin component contained in the resin composition for molding used in a sanitary absorbent article (hereinafter, sometimes simply referred to as "resin composition for a sanitary absorbent article") is, for example, a polyolefin, and among the polyolefins, one or more selected from the group consisting of polyethylene and polypropylene are preferable, and polyethylene is more preferable.

When polyethylene is used as the resin component, for example, two or more kinds of polyethylene having different densities may be used.

The polyolefin, which is a resin component of the resin composition for a sanitary absorbent article, is not particularly limited, but the MFR (190° C., 2.16 kgf) is preferably in the range of 0.1 to 20 g/10 minutes, and more preferably in the range of 0.5 to 5 g/10 minutes.

By setting the MFR to 0.1 g/10 minutes or more, the moldability of the thin film can be sufficiently maintained, and by setting the MFR to 20 g/10 minutes or less, the thin film can have sufficient strength.

The resin composition for a sanitary absorbent article may further include a polystyrene-based elastomer as a resin component.

Examples of the polystyrene-based elastomer include styrene-olefin-based (SEP, SEBC, or the like), styrene-olefin-styrene-based (SEPS, SEBS, or the like), styrene-diene-based (SIS, SBS, or the like), and hydrogenated styrene-diene-based (HSIS, HSBR, or the like) elastomers containing a styrene block.

The amount of the styrene component in these polystyrene elastomers is preferably in the range of 10 to 40% by mass, and more preferably in the range of 20 to 40% by mass.

Examples of the inorganic filler contained in the resin composition for a sanitary absorbent article include calcium carbonate, calcium sulfate, barium carbonate, and titanium oxide, and the inorganic filler is preferably one or more selected from the group consisting of calcium carbonate and barium sulfate.

The shape of these inorganic fillers is not particularly limited, but is preferably particulate, more preferably fine particles having an average particle diameter in the range of 0.1 to 10 µm, still more preferably fine particles having an average particle diameter in the range of 0.3 to 5 µm, and particularly preferably fine particles having an average particle diameter in the range of 0.5 to 3 µm.

The content of the inorganic filler in the resin composition for a sanitary absorbent article is, for example, preferably polyolefin to inorganic filler=60 to 20 parts by mass to 40 to 80 parts by mass, more preferably polyolefin to inorganic filler=55 to 25 parts by mass to 45 to 75 parts by mass, and still more preferably polyolefin to inorganic filler=50 to 30 parts by mass to 50 to 70 parts by mass.

When the content of the inorganic filler is within the above range, all of moisture permeability, air permeability, and liquid permeation resistance of the obtained sanitary absorbent article can be sufficiently secured.

The resin composition for a sanitary absorbent article may contain various additives other than the inorganic filler fluidity modifier of the present invention and the inorganic filler, and examples of the additives include the plasticizer, a viscosity reducing agent, a compatibilizer, a processing aid, an antioxidant, a heat stabilizer, a light stabilizer, an ultraviolet absorber, an anti-blocking agent, an anti-fogging agent, a delustering agent, a surfactant, an antibacterial agent, a deodorant, an antistatic agent, a water repellent, an oil repellent, a radiation shielding agent, a colorant, and a pigment.

A molded article obtained by molding the resin composition for a sanitary absorbent article can be suitably used as a back sheet (a sheet having air permeability and moisture permeability, but not allowing a liquid to pass therethrough) used in a sanitary absorbent article such as a disposable diaper or a sanitary napkin.

The back sheet can be produced, for example, by melt kneading the resin composition for a sanitary absorbent article, forming the kneaded product into a sheet by a T-die method or an inflation method, and then uniaxially or biaxially stretching the obtained sheet.

(Stone Paper)

The stone paper is a sheet containing calcium carbonate derived from limestone and a polyolefin (polyethylene, polypropylene, or the like), does not require water and wood for forming the sheet, and is a sheet excellent in sustainability because limestone as a raw material is present almost inexhaustibly on the earth.

The stone paper contains a large amount of calcium carbonate, but the fluidity of calcium carbonate can be enhanced by the inorganic filler fluidity modifier of the present invention, and therefore, the sheet physical properties can be enhanced.

The stone paper can be produced, for example, by melt kneading a stone paper composition containing calcium carbonate, a polyolefin, and the inorganic filler fluidity modifier of the present invention, and subjecting the kneaded mixture to inflation molding or extrusion molding.

In the stone paper composition, the content of calcium carbonate is, for example, 85:15 to 20:80, preferably 85:15 to 30:70, more preferably 85:15 to 35:65, and still more preferably 80:20 to 40:60 in terms of the mass ratio of polyolefin to calcium carbonate (polyolefin:calcium carbonate).

The stone paper composition may further include the plasticizer, a viscosity reducing agent, a foaming agent, a coloring agent, a lubricant, a coupling agent, a stabilizer (an antioxidant, an ultraviolet absorber, and the like), an antistatic agent, and the like as an auxiliary agent.

Examples of the foaming agent include aliphatic hydrocarbon compounds such as propane, n-butane, isobutane, n-pentane, isopentane, and hexane; alicyclic hydrocarbon compounds such as cyclohexane, cyclopentane, and cyclobutane; and halogenated hydrocarbon compounds such as trifluoromonochloroethane and difluorodichloromethane.

Examples of the lubricant include fatty acid-based lubricants such as stearic acid, hydroxystearic acid, complex stearic acid, and oleic acid; aliphatic alcohol-based lubricants; aliphatic amide-based lubricants such as stearoamide, oxystearoamide, oleylamide, erucylamide, ricinoleamide, behenamide, methylolamide, methylenebisstearoamide, methylenebisstearobehenamide, bisamide acids of higher fatty acids, and complex amides; aliphatic ester-based lubricants such as n-butyl stearate, methyl hydroxystearate, polyhydric alcohol fatty acid esters, saturated fatty acid esters, and ester-based waxes; and fatty acid metal soap-based lubricants.

As the antioxidant, a phosphorus-based antioxidant, a phenol-based antioxidant, a pentaerythritol-based antioxidant, or the like can be used.

Examples of the phosphorus-based antioxidant include phosphites such as triesters, diesters, and monoesters of phosphorous acid, such as triphenyl phosphite, trisnonylphenyl phosphite, and tris(2,4-di-tert-butylphenyl) phosphite; and phosphates such as trimethyl phosphate, triethyl phosphate, tributyl phosphate, trioctyl phosphate, triphenyl phosphate, tricresyl phosphate, tris(nonylphenyl) phosphate, and 2-ethylphenyl diphenyl phosphate.

Examples of the phenol-based antioxidant include α-tocopherol, butylhydroxytoluene, sinapyl alcohol, vitamin E, n-octadecyl-3-(3,5-di-tert-butyl-4-hydroxyphenyl) propionate, 2-tert-butyl-6-(3'-tert-butyl-5'-methyl-2'-hydroxybenzyl)-4-methylphenyl acrylate, 2,6-di-tert-butyl-4-(N,N-dimethylaminomethyl) phenol, 3,5-di-tert-butyl-4-hydroxybenzylphosphonate diethyl ester, and tetrakis[3-(3,5-di-tert-butyl-4-hydroxyphenyl)propionyloxymethyl] methane.

(Heat Dissipation Member)

In electronic devices such as personal computers, smartphones, and televisions, the amount of heat generated is increasing with the increase in capability, and a heat dissipation member including a thermally conductive filler is often used to efficiently dissipate the generated heat. In addition, automobiles such as electric vehicles and hybrid vehicles also include many electronic devices, and a heat dissipation member including a thermally conductive filler is often used.

Examples of the resin component contained in the resin composition for molding used for the heat dissipation member (hereinafter, simply referred to as a "resin composition for a heat dissipation member" in some cases) include a thermosetting resin, an active energy ray-curable resin, and a thermoplastic resin.

As the thermosetting resin of the resin composition for a heat dissipation member, a known thermosetting resin can be used, and examples thereof include novolac type phenol resins such as a phenol novolac resin and a cresol novolac resin; phenol resins such as a rezol type phenol resin such as an unmodified resol phenol resin and an oil-modified resol phenol resin modified with tung oil, linseed oil, walnut oil, or the like; bisphenol type epoxy resins such as a bisphenol A epoxy resin and a bisphenol F epoxy resin; novolac type epoxy resins such as an aliphatic chain-modified bisphenol epoxy resin, a novolac epoxy resin, and a cresol novolac epoxy resin; epoxy resins such as a biphenyl type epoxy resin and a polyalkylene glycol type epoxy resin; resins having triazine rings such as a urea resin and a melamine resin; vinyl resins such as a (meth)acrylic resin and a vinyl ester resin; an unsaturated polyester resin, a bismaleimide resin, a polyurethane resin, a diallyl phthalate resin, a silicone resin, a resin having a benzoxazine ring, a cyanate ester resin, and the like.

The thermosetting resin may be used together with a curing agent.

Examples of the curing agent to be used together with the thermosetting resin include amine compounds such as diaminodiphenylmethane, diethylenetriamine, triethylenetramine, diaminodiphenylsulfone, isophoronediamine, imidazol, BF3-amine complex, and guanidine derivative; amide compounds such as a polyamide resin synthesized from a dimer of dicyandiamide and linolenic acid and ethylenediamine; acid anhydride compounds such as phthalic anhydride, trimellitic anhydride, pyromellitic anhydride, maleic anhydride, tetrahydrophthalic anhydride, methyltetrahydrophthalic anhydride, methylnadic anhydride, hexahydrophthalic anhydride, and methylhexahydrophthalic anhydride; and phenol compounds such as a phenol novolac resin, a cresol novolac resin, an aromatic hydrocarbon formaldehyde resin-modified phenol resin, a dicyclopentadiene phenol addition-type resin, a phenol aralkyl resin (Xylok resin), a resorcin novolac resin, a naphthol aralkyl resin, a trimethylol methane resin, a tetraphenylol ethane resin, a naphthol novolac resin, a naphthol-phenol co-condensed novolac resin, a naphthol-cresol co-condensed novolac resin, a biphenyl-modified phenol resin, a biphenyl-modified naphthol resin, an aminotriazine-modified phenol resin, and an alkoxy group-containing aromatic ring-modified novolac resin.

As the thermoplastic resin of the resin composition for a heat dissipation member, a known thermoplastic resin can be used, and examples thereof include a polyethylene resin, a polypropylene resin, a polymethyl methacrylate resin, a polyvinyl acetate resin, an ethylene-propylene copolymer, an ethylene-vinyl acetate copolymer, a polyvinyl chloride resin, a polystyrene resin, a polyacrylonitrile resin, a polyamide resin, a polycarbonate resin, a polyacetal resin, a polyethylene terephthalate resin, a polyphenylene oxide resin, a polyphenylene sulfide resin, a polysulfone resin, a polyethersulfone resin, a polyether ether ketone resin, a polyallylsulfone resin, a thermoplastic polyimide resin, a thermoplastic urethane resin, a polyaminobismaleimide resin, a polyamideimide resin, a polyetherimide resin, a bismaleimide triazine resin, a polymethylpentene resin, a fluorinated resin, a liquid crystal polymer, an olefin-vinyl alcohol copolymer, an ionomer resin, a polyarylate resin, an acrylonitrile-ethylene-styrene copolymer, an acrylonitrile-butadiene-styrene copolymer, and an acrylonitrile-styrene copolymer.

Examples of the thermally conductive filler contained in the resin composition for a heat dissipation member include alumina, aluminum hydroxide, magnesium hydroxide, calcium carbonate, magnesium carbonate, calcium silicate, calcium oxide, magnesium oxide, zinc oxide, beryllia, aluminum oxide, aluminum nitride, boron nitride, hydrated metal compounds, fused silica, crystalline silica, amorphous silica, silicon carbide, silicon nitride, titanium carbide, and diamond.

The thermally conductive filler may be surface-treated with a silane-based, titanate-based, or aluminate-based coupling agent.

The shape of the thermally conductive filler is not particularly limited, and may be any of a spherical shape, a needle-like shape, a flake shape, a dendritic shape, and a fibrous shape.

The content of the thermally conductive filler in the resin composition for a heat dissipation member can be appropriately adjusted depending on the application, and the thermally conductive filler is preferably in the range of 30 to 500 parts by mass with respect to 100 parts by mass of the resin component.

The resin composition for a heat dissipation member may contain various additives other than the inorganic filler fluidity modifier of the present invention and the thermally conductive filler, and examples of the additives include a dye, a pigment, an antioxidant, a polymerization inhibitor, a defoaming agent, a leveling agent, an ion scavenger, a humectant, a viscosity modifier, a preservative, an antibacterial agent, an antistatic agent, an antiblocking agent, an ultraviolet absorber, and an infrared absorber.

When the resin composition for a heat dissipation member contains a thermosetting resin, the heat dissipation member can be molded by heating the resin composition for a heat dissipation member. When the resin composition for a heat dissipation member contains an active energy ray-curable resin, curing and molding can be performed by irradiation with an active energy ray such as an ultraviolet ray or an infrared ray. When the resin composition for a heat dissipation member contains a thermoplastic resin, the heat dissipation member can be obtained by a known molding method such as injection molding, extrusion molding, or press molding.

The heat dissipation member obtained by molding the resin composition for a heat dissipation member can be used as a heat sink. The heat dissipation member obtained by molding the resin composition for a heat dissipation member can also be used as a heat dissipation bonding member for making a bonding between a portion to be subjected to heat dissipation and a metal heat dissipation member.

The resin composition for a heat dissipation member can also be used as a semiconductor sealing material.

EXAMPLES

Hereinafter, the present invention will be specifically described by way of Examples and Comparative Examples.

Note that the present invention is not limited to the following Examples.

In the examples of the present application, the values of the acid value and the hydroxyl value are values evaluated by the following methods.

[Method for Measuring Acid Value]

The acid value was measured by a method in accordance with JIS K 0070-1992.

[Method for Measuring Hydroxyl Value]

The hydroxyl value was measured by a method in accordance with JIS K 0070-1992.

In the examples of the present application, the number average molecular weight of the polyester is a value in terms of polystyrene based on GPC measurement, and the measurement conditions are as follows.

[GPC Measurement Conditions]

Measuring apparatus: high-speed GPC apparatus "HLC-8320GPC" manufactured by Tosoh Corporation Column: "TSK GURDCOLUMN SuperHZ-L" manufactured by Tosoh Corporation+"TSK gel SuperHZM-M" manufactured by Tosoh Corporation+"TSK gel Super-HZM-M" manufactured by Tosoh Corporation+"TSK gel SuperHZ-2000" manufactured by Tosoh Corporation+"TSK gel SuperHZ-2000" manufactured by Tosoh Corporation Detector: RI (differential refractometer)

Data processing: "EcoSEC Data Analysis Version 1.07" manufactured by Tosoh Corporation Column temperature: 40° C.

Developing solvent: tetrahydrofuran

Flow rate: 0.35 mL/min

Measurement sample: 7.5 mg of a sample was dissolved in 10 mL of tetrahydrofuran, and the obtained solution was filtered through a microfilter to obtain a measurement sample.

Sample injection amount: 20 µL

Standard sample: The following monodisperse polystyrene having a known molecular weight was used in accordance with the measurement manual of the "HLC-8320GPC".

(Monodisperse Polystyrene)

"A-300" manufactured by Tosoh Corporation
"A-500" manufactured by Tosoh Corporation
"A-1000" manufactured by Tosoh Corporation
"A-2500" manufactured by Tosoh Corporation
"A-5000" manufactured by Tosoh Corporation
"F-1" manufactured by Tosoh Corporation
"F-2" manufactured by Tosoh Corporation
"F-4" manufactured by Tosoh Corporation
"F-10" manufactured by Tosoh Corporation
"F-20" manufactured by Tosoh Corporation
"F-40" manufactured by Tosoh Corporation
"F-80" manufactured by Tosoh Corporation
"F-128" manufactured by Tosoh Corporation
"F-288" manufactured by Tosoh Corporation

Synthesis Example 1: Synthesis of Fluidity Modifier A 1859 g of hardened castor oil fatty acids (main component: 12-hydroxystearic acid), 325 g of isononyl alcohol, and 0.064 g of tin ocrylate (NEOSTANN U-28, manufactured by NITTO KASEI CO., LTD.) as an esterification catalyst were charged into a four-necked flask having an inner volume of 3 liters equipped with a thermometer, a stirrer, and a reflux condenser, and the mixture was subjected to a condensation reaction for a total of 24 hours by gradually increasing the temperature to 210° C. while stirring under a nitrogen gas stream. After confirming that the acid value was 1 or less, the temperature was lowered to 120° C. 89.0 g of maleic anhydride was charged, and the mixture was reacted at 120° C. Disappearance of maleic anhydride was confirmed by IR to obtain a fluidity modifier A (acid value: 19 mgKOH/g, hydroxyl value: 14 mgKOH/g, number average molecular weight: 1,620), which is a liquid polyester resin at room temperature.

Synthesis Examples 2 to 4: Synthesis of Fluidity Modifiers B, C, and D

A fluidity modifier B (acid value: 34 mgKOH/g, hydroxyl value: 20 mgKOH/g, number average molecular weight: 1,050), a fluidity modifier C (acid value: 16 mgKOH/g, hydroxyl value: 10 mgKOH/g, number average molecular weight: 2,200), and a fluidity modifier D (acid value: 19 mgKOH/g, hydroxyl value: 36 mgKOH/g, number average molecular weight: 1,160) were obtained in the same manner as in Synthesis Example 1, respectively, except that the amounts of hardened castor oil fatty acids, isononyl alcohol, and maleic anhydride used were adjusted.

All were liquids at room temperature.

Synthesis Example 5: Synthesis of Fluidity Modifier E 987 g of hardened castor oil fatty acids (main component: 12-hydroxystearic acid), 132 g of isononyl alcohol, and 1.05 g of tin octylate (NEOSTANN U-28, manufactured by NITTO KASEI CO., LTD.) as an esterification catalyst were charged into a four-necked flask having an inner volume of 2 liters equipped with a thermometer, a stirrer, and a reflux condenser, and the mixture was subjected to a condensation reaction for a total of 34 hours by gradually increasing the temperature to 220° C. while stirring under a nitrogen gas stream. After confirming that the acid value was 1 or less, the temperature was lowered to 150° C. 58.9 g of phthalic anhydride was charged, and the mixture was reacted at 150° C. Disappearance of phthalic anhydride was confirmed by IR to obtain a fluidity modifier E (acid value: 18 mgKOH/g, hydroxyl value: 4 mgKOH/g, number average molecular weight: 2,560), which is a liquid polyester resin at room temperature.

Synthesis Example 6: Synthesis of Fluidity Modifier F 1859 g of hardened castor oil fatty acids (main component: 12-hydroxystearic acid), 325 g of isononyl alcohol, and 0.064 g of tin octylate (NEOSTANN U-28, manufactured by NITTO KASEI CO., LTD.) as an esterification catalyst were charged into a four-necked flask having an inner volume of 3 liters equipped with a thermometer, a stirrer, and a reflux condenser, and the mixture was subjected to a condensation reaction for a total of 24 hours by gradually increasing the temperature to 210° C. while stirring under a nitrogen gas stream. After confirming that the acid value was 1 or less, the temperature was lowered to 150° C. 140 g of phthalic anhydride was charged, and the mixture was reacted at 150° C. Disappearance of phthalic anhydride was confirmed by IR to obtain a fluidity modifier F (acid value: 17 mgKOH/g, hydroxyl value: 16 mgKOH/g, number average molecular weight: 1,460), which is a liquid polyester resin at room temperature.

Synthesis Example 7: Synthesis of Fluidity Modifier G 1302 g of hardened castor oil fatty acids (main component: 12-hydroxystearic acid), 355 g of isononyl alcohol, and 0.10 g of tin octylate (NEOSTANN U-28, manufactured by NITTO KASEI CO., LTD.) as an esterification catalyst were charged into a four-necked flask having an inner volume of 3 liters equipped with a thermometer, a stirrer, and a reflux condenser, and the mixture was subjected to a condensation reaction for a total of 24 hours by gradually increasing the temperature to 210° C. while stirring under a nitrogen gas stream. After confirming that the acid value was 1 or less, the temperature was lowered to 150° C. 113 g of succinic anhydride was charged, and the mixture was reacted at 150° C. Disappearance of succinic anhydride was confirmed by IR to obtain a fluidity modifier G (acid value: 45 mgKOH/g, hydroxyl value: 22 mgKOH/g, number average molecular weight: 1,200), which is a liquid polyester resin at room temperature.

Synthesis Example 1: Synthesis of Fluidity Modifier A'

459.3 g of 1,3-butanediol, 48.7 g of neopentyl glycol, 616.2 g of adipic acid, and 0.112 g of tetraisopropyl titanate as an esterification catalyst were charged into a four-necked flask having an inner volume of 2 liters equipped with a thermometer, a stirrer, and a reflux condenser, and the mixture was subjected to a condensation reaction for a total of 10 hours by gradually increasing the temperature to 220° C. while stirring under a nitrogen gas stream. 44.2 g of maleic anhydride was charged, and the mixture was reacted at 150° C. Disappearance of maleic anhydride was confirmed by IR to obtain a fluidity modifier A' (acid value: 29 mgKOH/g, hydroxyl value: 120, number average molecular weight: 950), which is a liquid polyester resin at room temperature.

Synthesis Example 2: Synthesis of Fluidity Modifier B'

987 g of hardened castor oil fatty acids (main component: 12-hydroxystearic acid), 132 g of isononyl alcohol, and 1.05 g of tin ocrylate (NEOSTANN U-28, manufactured by NITTO KASEI CO., LTD.) as an esterification catalyst were charged into a four-necked flask having an inner volume of 2 liters equipped with a thermometer, a stirrer, and a reflux condenser, and the mixture was subjected to a condensation reaction for a total of 34 hours by gradually increasing the temperature to 220° C. while stirring under a nitrogen gas stream. After confirming that the acid value became 1 or less, a flowability modifier B' (acid value: 0.4 mgKOH/g, hydroxyl value: 21 mgKOH/g, number average molecular weight: 2,870), which is a liquid polyester resin at room temperature, was obtained.

In addition to the fluidity modifiers A to G, the fluidity modifier A', and the fluidity modifier B', n-hexyl ether known as a fluidity modifier was also separately prepared.

Examples 1 to 13 and Comparative Examples 1 to 6: Preparation and Evaluation of Ground Calcium Carbonate-Containing Composition Calcium carbonate (ground calcium carbonate, "SUPER S" manufactured by MARUO CALCIUM CO., LTD.) as an inorganic filler, DINP (diisononyl phthalate) as a plasticizer, DETDA (diethyltoluenediamine) as an active hydrogen compound, and a fluidity modifier were blended in the proportions shown in Tables 1 and 2, and the mixture was stirred with a rotation/revolution stirrer (THINKY ARV-310) at 1000 rpm and 0.2 Pa for 2 minutes to obtain an inorganic filler-containing composition in the form of a paste.

The viscosity of the obtained paste was evaluated by the following method. The results are shown in Tables 1 and 2.
(Method for Measuring Viscosity)

The viscosity of the obtained paste was measured with an E-type viscometer (TV-25H manufactured by Toyo Sangyo Co., Ltd.) using a standard rotor (1° 34'×R24, shear rate [1/S] 3.83×N, N is the rotation speed [rpm] of the rotor). To be specific, the obtained paste was treated at a measurement temperature of 25° C. and a rotation speed of 10 rpm, and the viscosity value of the paste after treatment for 3 minutes was read.

TABLE 1

| | | Example | | | | | | | | | | | | |
|---|---|---|---|---|---|---|---|---|---|---|---|---|---|---|
| | | 1 | 2 | 3 | 4 | 5 | 6 | 7 | 8 | 9 | 10 | 11 | 12 | 13 |
| Blending proportion [parts by mass] | Calcium carbonate (SUPER S) | 60 | 60 | 60 | 60 | 60 | 60 | 60 | 60 | 60 | 60 | 60 | 60 | 60 |
| | DINP | 33 | 33 | 33 | 33 | 33 | 33 | 33 | 33 | 33 | 33 | 33 | 33 | 33 |
| | DETDA | 7 | 7 | 7 | 7 | 7 | 7 | 7 | 7 | 7 | 7 | 7 | 7 | 7 |
| | Fluidity modifier A | 0.1 | 0.3 | 1 | | | | | | | | | | |
| | Fluidity modifier B | | | | 0.1 | 0.3 | | | | | | | | |
| | Fluidity modifier C | | | | | | 0.1 | 0.3 | | | | | | |
| | Fluidity modifier D | | | | | | | | 0.1 | 0.3 | | | | |
| | Fluidity modifier E | | | | | | | | | | 1 | | | |
| | Fluidity modifier F | | | | | | | | | | | 0.3 | | |
| | Fluidity modifier G | | | | | | | | | | | | 0.1 | 0.3 |
| Viscosity [mPa · s] | | 1,140 | 880 | 830 | 760 | 690 | 1,010 | 660 | 1,280 | 700 | 1,100 | 950 | 880 | 820 |

TABLE 2

| | | Comparative Example | | | | | |
|---|---|---|---|---|---|---|---|
| | | 1 | 2 | 3 | 4 | 5 | 6 |
| Blending proportion [parts by mass] | Calcium carbonate (SUPER S) | 60 | 60 | 60 | 60 | 60 | 60 |
| | DINP | 33 | 33 | 33 | 33 | 33 | 33 |
| | DETDA | 7 | 7 | 7 | 7 | 7 | 7 |
| | n-Hexyl ether | | 0.3 | 1 | | | |
| | Fluidity modifier A' | | | | 0.3 | 1 | |
| | Fluidity modifier B' | | | | | | 1 |
| Viscosity [mPa · s] | | >5,120 | >5,120 | >5,120 | >5,120 | 2,880 | >5,120 |

It can be read that the viscosity of the calcium carbonate-containing composition using each of the fluidity modifiers A to F of Examples 1 to 13 is suppressed to be low, whereas the viscosity of the calcium carbonate-containing composition using each of n-hexyl ether, which is a viscosity reducing agent, and the fluidity modifiers A' and B' of Comparative Examples 1 to 6 is high.

Example 14 and Comparative Examples 7 to 10: Preparation and Evaluation of Colloidal Calcium Carbonate-Containing Composition Calcium carbonate (colloidal calcium carbonate, "KAL-FAIN 200" manufactured by MARUO CALCIUM CO., LTD.) as an inorganic filler, DINP (diisononyl phthalate) as a plasticizer, and a fluidity modifier were blended in the proportions shown in Table 3, and the mixture was stirred with a planetary stirrer (THINKY ARV-310) at 1000 rpm and 0.2 Pa for 2 minutes to obtain an inorganic filler-containing composition in the form of a paste.

The viscosity of the obtained paste was evaluated by the above-described method. The results are shown in Table 3.

TABLE 3

| | | Example 14 | Comparative Example 7 | Comparative Example 8 | Comparative Example 9 | Comparative Example 10 |
|---|---|---|---|---|---|---|
| Blending proportion [parts by mass] | Calcium carbonate (KALFAIN 200) | 45 | 45 | 45 | 45 | 45 |
| | DINP | 55 | 55 | 55 | 55 | 55 |
| | Fluidity modifier A | 1 | | | | |
| | n-Hexyl ether | | | 1 | | |
| | Fluidity modifier A' | | | | 1 | |
| | Fluidity modifier B' | | | | | 1 |
| Viscosity [mPa · s] | | 960 | >5,120 | >5,120 | >5,120 | >5,120 |

Examples 15 to 20 and Comparative Examples 11 to 19: Preparation and Evaluation of Aluminum-based Inorganic Filler-Containing Composition High-purity alumina ("AKP-3000" manufactured by Sumitomo Chemical Company, Limited), spherical alumina ("DAW-07" manufactured by Denka Company Limited), or aluminum hydroxide as an inorganic filler, DINP (diisononyl phthalate) as a plasticizer, and a fluidity modifier were blended in the proportions shown in Tables 4 and 5, and the mixture was stirred with a planetary stirrer (THINKY ARV-310) at 1000 rpm and 0.2 Pa for 2 minutes to obtain an inorganic filler-containing composition in the form of a paste.

The fluidity and viscosity of the obtained paste were evaluated by the following methods. The results are shown in Tables 4 and 5.

(Method for Evaluating Fluidity)

About 0.4 g of the obtained composition was dropped onto a horizontal glass substrate with a dropper. After the dropwise addition, the glass substrate was tilted so that the tilt angle was 80° with respect to the horizontal, and a case where the composition on the glass substrate flowed from the glass substrate was evaluated as "A", and a case where the composition did not flow from the glass substrate but remained was evaluated as "NG". The evaluation was carried out at 25° C.

(Method for Measuring Viscosity)

The viscosity of the obtained paste was measured with an E-type viscometer (TV-25H manufactured by Toyo Sangyo Co., Ltd.) using a rotor No. 6 (3°×R9.7, shear rate [1/S] 2.00×N, N is the rotation speed [rpm] of the rotor). To be specific, the obtained paste was treated at a measurement temperature of 25° C. and a rotation speed of 1 rpm, and the viscosity value of the paste after treatment for 3 minutes was read.

TABLE 4

| | | Example | | | | | |
|---|---|---|---|---|---|---|---|
| | | 15 | 16 | 17 | 18 | 19 | 20 |
| Blending proportion [parts by mass] | High-purity alumina (AKP-3000) | 50 | 50 | | | | |
| | Spherical alumina (DAW-07) | | | 80 | 80 | | |

TABLE 4-continued

|  |  | Example | | | | | |
|---|---|---|---|---|---|---|---|
|  |  | 15 | 16 | 17 | 18 | 19 | 20 |
|  | Aluminum hydroxide |  |  |  |  | 77 | 77 |
|  | DINP | 50 | 50 | 20 | 20 | 23 | 23 |
|  | Fluidity modifier B | 0.3 |  | 0.3 |  | 1 |  |
|  | Fluidity modifier G |  | 0.3 |  | 0.3 |  | 1 |
| Fluidity |  | A | A | A | A | A | A |
| Viscosity [mPa · s] |  | 5,000 | 4,000 | 5,000 | 6,000 | 17,100 | 17,100 |

TABLE 5

|  |  | Comparative Example 11 | Comparative Example 12 | Comparative Example 13 | Comparative Example 14 | Comparative Example 15 | Comparative Example 16 | Comparative Example 17 | Comparative Example 18 | Comparative Example 19 |
|---|---|---|---|---|---|---|---|---|---|---|
| Blending proportion [parts by mass] | High-purity alumina (AKP-3000) | 50 | 50 | 50 |  |  |  |  |  |  |
|  | Spherical alumina (DAW-07) |  |  |  | 80 | 80 | 80 |  |  |  |
|  | Aluminum hydroxide |  |  |  |  |  |  | 77 | 77 | 77 |
|  | DINP | 50 | 50 | 50 | 20 | 20 | 20 | 23 | 23 | 23 |
|  | n-Hexyl ether |  | 1 |  |  | 1 |  |  | 1 |  |
|  | Fluidity modifier A' |  |  | 1 |  |  | 1 |  |  | 1 |
| Fluidity |  | NG | NG | NG | NG | NG | NG | NG | NG | NG |
| Viscosity [mPa · s] |  | 313,000 | 258,000 | 73,900 | 22,500 | 25,500 | 28,200 | 72,100 | 38,300 | 26,700 |

It can be read that the aluminum-based inorganic filler-containing compositions using the fluidity modifier B or the fluidity modifier G of Examples 15 to 20 have good fluidity, whereas the fluidity is not obtained in Comparative Examples 11 to 19.

Examples 21 to 32 and Comparative Examples 20 to 22: Preparation and Evaluation of Ground Calcium Carbonate-Containing Composition Calcium carbonate (ground calcium carbonate, "SUPER S" manufactured by MARUO CALCIUM CO., LTD.) as an inorganic filler, DINP (diisononyl phthalate), PB-10 (benzoic acid ester-based plasticizer, manufactured by DIC Corporation), or DINA (diisononyl adipate) as a plasticizer, silicone oil ("KF-54" manufactured by Shin-Etsu Silicone Co., Ltd.), squalene, or paraffin-based process oil ("P-100" manufactured by Japan Sun Oil Co., Ltd.) as a resin, and a fluidity modifier were blended in the proportions shown in Tables 6 and 7, and the mixture was stirred with a planetary stirrer (THINKY ARV-310) at 1000 rpm and 0.2 Pa for 2 minutes to obtain an inorganic filler-containing composition in the form of a paste.

The fluidity and viscosity of the obtained paste were evaluated by the following methods. The results are shown in Tables 6 and 7.

(Method for Evaluating Fluidity)

About 0.4 g of the obtained composition was dropped onto a horizontal glass substrate with a dropper. After the dropwise addition, the glass substrate was tilted so that the tilt angle was 80° with respect to the horizontal, and a case where the composition on the glass substrate flowed from the glass substrate was evaluated as "A", and a case where the composition did not flow from the glass substrate but remained was evaluated as "NG". The evaluation was carried out at 25° C.

(Method for Measuring Viscosity)

The viscosity of the obtained paste was measured with an E-type viscometer (TV-25H manufactured by Toyo Sangyo Co., Ltd.) using a standard rotor (1° 34'×R24, shear rate [1/S] 3.83×N, N is the rotation speed [rpm] of the rotor). To be specific, the obtained paste was treated at a measurement temperature of 25° C. and a rotation speed of 10 rpm, and the viscosity value of the paste after treatment for 3 minutes was read.

TABLE 6

|  |  | Example | | | | | | | | | | | |
|---|---|---|---|---|---|---|---|---|---|---|---|---|---|
|  |  | 21 | 22 | 23 | 24 | 25 | 26 | 27 | 28 | 29 | 30 | 31 | 32 |
| Blending proportion [parts by mass] | Calcium carbonate (SUPER S) | 52 | 52 | 52 | 52 | 52 | 52 | 50 | 50 | 60 | 60 | 52 | 52 |
|  | DINP | 48 | 48 |  |  |  |  |  |  |  |  |  |  |
|  | PB-10 |  |  | 48 | 48 |  |  |  |  |  |  |  |  |
|  | DINA |  |  |  |  | 48 | 48 |  |  |  |  |  |  |
|  | Silicone oil (KF-54) |  |  |  |  |  |  | 50 | 50 |  |  |  |  |
|  | Squalene |  |  |  |  |  |  |  |  | 40 | 40 |  |  |
|  | Process oil (P-100) |  |  |  |  |  |  |  |  |  |  | 48 | 48 |
|  | Fluidity modifier A | 1 |  | 1 |  | 1 |  | 1 |  | 1 |  | 1 |  |
|  | Fluidity modifier G |  | 1 |  | 1 |  | 1 |  | 1 |  | 1 |  | 1 |

TABLE 6-continued

|  | Example | | | | | | | | | | | |
|---|---|---|---|---|---|---|---|---|---|---|---|---|
|  | 21 | 22 | 23 | 24 | 25 | 26 | 27 | 28 | 29 | 30 | 31 | 32 |
| Fluidity | A | A | A | A | A | A | A | A | A | A | A | A |
| Viscosity [mPa · s] | 340 | 350 | 720 | 700 | 110 | 105 | 2,300 | 2,090 | 140 | 70 | 320 | 250 |

TABLE 7

|  |  | Comparative Example 20 | Comparative Example 21 | Comparative Example 22 |
|---|---|---|---|---|
| Blending proportion [parts by mass] | Calcium carbonate (SUPER S) | 50 | 60 | 52 |
|  | DINP PB-10 |  |  |  |
|  | DINA |  |  |  |
|  | Silicone oil (KF-54) | 50 |  |  |
|  | Squalene |  | 40 |  |
|  | Process oil (P-100) |  |  | 48 |
|  | Fluidity modifier A' | 1 | 1 | 1 |
| Fluidity |  | NG | NG | NG |
| Viscosity [mPa · s] |  | 3,850 | 1,700 | 1,320 |

It can be read that the inorganic filler-containing compositions using the fluidity modifier A or the fluidity modifier G of Examples 21 to 32 have good fluidity, whereas the fluidity is not obtained in Comparative Examples 20 to 22 using the fluidity modifier A'.

Example 33 and Comparative Examples 23 and 24: Preparation and Evaluation of Aluminum-Based Inorganic Filler-Containing Composition Spherical alumina ("DAW-07" and "DAW-45") manufactured by Denka Company Limited) as an inorganic filler, a bisphenol A-type epoxy resin, and a fluidity modifier were blended in the proportions shown in Table 8, and the mixture was stirred with a planetary stirrer (THINKY ARV-310) at 1000 rpm and 0.2 Pa for 2 minutes to obtain an inorganic filler-containing composition in the form of a paste.

The viscosity of the obtained paste was evaluated by the following method. The results are shown in Table 8.
(Method for Measuring Viscosity)

The viscosity of the obtained paste was measured with an E-type viscometer (TV-25H manufactured by Toyo Sangyo Co., Ltd.) using a rotor No. 6 (3°×R9.7, shear rate [1/S] 2.00×N, N is the rotation speed [rpm] of the rotor). To be specific, the obtained paste was treated at a measurement temperature of 25° C. and a rotation speed of 2 rpm, and the viscosity value of the paste after treatment for 3 minutes was read.

TABLE 8

|  |  | Example 33 | Comparative Example 23 | Comparative Example 24 |
|---|---|---|---|---|
| Blending proportion [parts by mass] | Spherical alumina (DAW-07) | 40 | 40 | 40 |
|  | Spherical alumina (DAW-45) | 40 | 40 | 40 |
|  | Bisphenol A-type epoxy resin | 20 | 20 | 20 |

TABLE 8-continued

|  | Example 33 | Comparative Example 23 | Comparative Example 24 |
|---|---|---|---|
| Fluidity modifier B | 1 |  |  |
| Fluidity modifier A' |  |  | 1 |
| Viscosity [mPa · s] | 60 | 196 | 294 |

It can be read that even when the dispersion medium is a resin such as bisphenol A-type epoxy resin, high fluidity can be obtained by using the fluidity modifier B.

The invention claimed is:

1. An inorganic filler fluidity modifier which is an ester resin represented by the following general formula (1):

[Chem. 1]

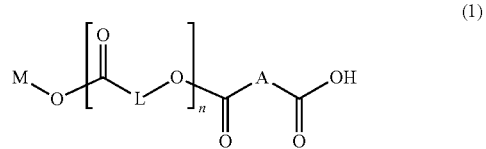

wherein M represents an aliphatic monoalcohol residue having 3 to 18 carbon atoms; L represents a ricinoleic acid residue or an aliphatic hydroxycarboxylic acid residue in which one hydroxy group is substituted on an aliphatic chain of an aliphatic carboxylic acid selected from the group consisting of pentadecylic acid, palmitic acid, margaric acid, and stearic acid; A represents an aliphatic dicarboxylic acid residue having 1 to 8 carbon atoms or an aromatic dicarboxylic acid residue having 6 to 18 carbon atoms; and n represents the number of repetitions.

2. The inorganic filler fluidity modifier according to claim 1, wherein M is an aliphatic monoalcohol residue having a branched structure having 5 to 18 carbon atoms.

3. The inorganic filler fluidity modifier according to claim 1, wherein A is an aliphatic dicarboxylic acid residue having 2 to 4 carbon atoms.

4. The inorganic filler fluidity modifier according to claim 1, which has an acid value in a range of 5 to 120 mgKOH/g.

5. The inorganic filler fluidity modifier according to claim 1, which has a number average molecular weight in a range of 500 to 5,000.

6. The inorganic filler fluidity modifier according to claim 1, which is a liquid at room temperature.

7. The inorganic filler fluidity modifier according to claim 1, which is used for one or more inorganic fillers selected from the group consisting of calcium carbonate, silica, alumina, aluminum hydroxide, talc, barium titanate, boron nitride, and aluminum nitride.

8. An inorganic filler-containing resin composition comprising a resin, an inorganic filler, and the inorganic filler fluidity modifier according to claim 1.

9. The inorganic filler-containing resin composition according to claim 8, wherein the inorganic filler is one or more selected from the group consisting of calcium carbonate, silica, alumina, aluminum hydroxide, talc, and barium titanate.

10. The inorganic filler-containing resin composition according to claim 8, further comprising a plasticizer.

11. The inorganic filler-containing resin composition according to claim 8, wherein the resin is one or more selected from the group consisting of polyolefin, polyester, polysulfide, polyvinyl chloride, modified polysulfide, silicone resin, modified silicone resin, acrylic urethane resin, epoxy resin, polyurethane, acrylic resin, polyester, and unsaturated polyester.

12. A molded article of the inorganic filler-containing resin composition according to claim 8.

13. An inorganic filler fluidity modifier which is an ester resin represented by the following general formula (1) and which is a liquid at room temperature:

[Chem. 2]

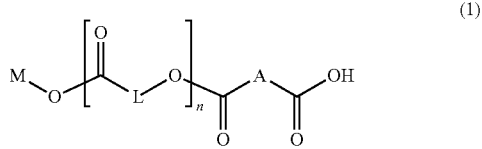
(1)

wherein M represents an aliphatic monoalcohol residue having 3 to 18 carbon atoms; L represents a ricinoleic acid residue or an aliphatic hydroxycarboxylic acid residue in which one hydroxy group is substituted on an aliphatic chain of an aliphatic carboxylic acid selected from the group consisting of pentadecylic acid, palmitic acid, margaric acid, and stearic acid; A represents an aliphatic dicarboxylic acid residue having 1 to 8 carbon atoms or an aromatic dicarboxylic acid residue having 6 to 18 carbon atoms; and n represents the number of repetitions.

14. The inorganic filler fluidity modifier according to claim 13, wherein L is an aliphatic hydroxycarboxylic acid residue having a branched structure having 2 to 23 carbon atoms in which one hydroxy group is substituted on an aliphatic chain of an aliphatic carboxylic acid selected from the group consisting of pentadecylic acid, palmitic acid, margaric acid, and stearic acid.

15. The inorganic filler fluidity modifier according to claim 13, wherein M is an aliphatic monoalcohol residue having a branched structure having 5 to 18 carbon atoms.

16. The inorganic filler fluidity modifier according to claim 13, wherein A is an aliphatic dicarboxylic acid residue having 2 to 4 carbon atoms.

17. The inorganic filler fluidity modifier according to claim 13, which has an acid value in a range of 5 to 120 mgKOH/g.

18. The inorganic filler fluidity modifier according to claim 13, which has a number average molecular weight in a range of 500 to 5,000.

19. The inorganic filler fluidity modifier according to claim 13, which is used for one or more inorganic fillers selected from the group consisting of calcium carbonate, silica, alumina, aluminum hydroxide, talc, barium titanate, boron nitride, and aluminum nitride.

20. An inorganic filler-containing resin composition comprising a resin, an inorganic filler, and the inorganic filler fluidity modifier according to claim 13.

\* \* \* \* \*